(12) United States Patent
Budianu et al.

(10) Patent No.: US 8,718,164 B2
(45) Date of Patent: *May 6, 2014

(54) PILOT DESIGN FOR IMPROVED CHANNEL AND INTERFERENCE ESTIMATION

(71) Applicant: QUALCOMM Incorporated, San Diego, CA (US)

(72) Inventors: Petru Cristian Budianu, San Diego, CA (US); Dhananjay Ashok Gore, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,653

(22) Filed: Apr. 29, 2013

(65) Prior Publication Data

US 2013/0235946 A1 Sep. 12, 2013

Related U.S. Application Data

(60) Continuation of application No. 13/402,537, filed on Feb. 22, 2012, now Pat. No. 8,432,985, which is a division of application No. 11/691,243, filed on Mar. 26, 2007, now Pat. No. 8,130,867.

(60) Provisional application No. 60/883,756, filed on Jan. 5, 2007.

(51) Int. Cl.
*H04B 7/06* (2006.01)

(52) U.S. Cl.
USPC ........... 375/260; 375/316; 375/259; 375/284; 375/285; 375/346; 375/345; 375/359; 375/365; 375/366; 375/368

(58) Field of Classification Search
USPC ......... 375/260, 316, 259, 284, 285, 346, 345, 375/359, 365, 366, 368
See application file for complete search history.

(56) References Cited

U.S. PATENT DOCUMENTS 5,852,630 A 12/1998 Langberg et al.
(Continued)

FOREIGN PATENT DOCUMENTS

JP 2005508109 A 3/2005
(Continued)

OTHER PUBLICATIONS

International Search Report—PCT/US08/050136—International Search Authority, European Patent Office—Jul. 16, 2008.

(Continued)

*Primary Examiner* — Siu Lee
(74) *Attorney, Agent, or Firm* — Donald C. Kordich

(57) ABSTRACT

Techniques for transmitting pilot and for processing received pilot to obtain channel and interference estimates are described. A terminal may generate pilot symbols for a first cluster in a time frequency block based on a first sequence and may generate pilot symbols for a second cluster in the time frequency block based on a second sequence. The first and second sequences may include common elements arranged in different orders and may be considered as different versions of a single sequence. The terminal may transmit the pilot symbols in their respective clusters. A base station may obtain received pilot symbols from multiple clusters in the time frequency block. The base station may form each of multiple basis vectors with multiple versions of the sequence assigned to the terminal and may process the received pilot symbols with the multiple basis vectors to obtain a channel estimate for the terminal.

17 Claims, 7 Drawing Sheets

(56) References Cited

U.S. PATENT DOCUMENTS

| | | |
|---|---|---|
| 5,852,710 A | 12/1998 | Shiohara et al. |
| 6,856,604 B2 | 2/2005 | Lundby |
| 6,947,748 B2 | 9/2005 | Li et al. |
| 7,362,695 B2 | 4/2008 | Akahori |
| 7,418,046 B2 | 8/2008 | Gore et al. |
| 7,564,829 B2 * | 7/2009 | Jin et al. .................. 370/343 |
| 7,733,828 B2 | 6/2010 | Qu et al. |
| 7,746,938 B2 | 6/2010 | Hasegawa et al. |
| 7,830,976 B2 | 11/2010 | Gorokhov et al. |
| 8,027,243 B2 | 9/2011 | Jin et al. |
| 8,111,763 B2 | 2/2012 | Ma et al. |
| 8,130,867 B2 | 3/2012 | Budianu et al. |
| 8,432,985 B2 | 4/2013 | Budianu et al. |
| 2004/0062192 A1 | 4/2004 | Liu et al. |
| 2005/0243939 A1 | 11/2005 | Jung et al. |
| 2006/0028976 A1 | 2/2006 | Park et al. |
| 2006/0133526 A1 | 6/2006 | Zhang et al. |
| 2006/0146948 A1 | 7/2006 | Park et al. |
| 2006/0172704 A1 | 8/2006 | Nishio et al. |
| 2006/0209670 A1 | 9/2006 | Gorokhov et al. |
| 2006/0209754 A1 | 9/2006 | Ji et al. |
| 2007/0053282 A1 * | 3/2007 | Tong et al. .................. 370/208 |
| 2007/0223610 A1 | 9/2007 | Jacobsen |
| 2008/0002566 A1 | 1/2008 | Zhang et al. |
| 2008/0075181 A1 | 3/2008 | Xia et al. |
| 2008/0095223 A1 | 4/2008 | Tong et al. |
| 2008/0253279 A1 | 10/2008 | Ma et al. |

FOREIGN PATENT DOCUMENTS

| | | |
|---|---|---|
| JP | 2006033083 A | 2/2006 |
| RU | 2278474 | 6/2006 |
| RU | 2316123 | 1/2008 |
| WO | WO-03029915 A2 | 4/2003 |
| WO | 03061170 A1 | 7/2003 |
| WO | 2006010159 | 1/2006 |
| WO | 2006019708 A1 | 2/2006 |
| WO | 2006034577 | 4/2006 |
| WO | 2006099577 A1 | 9/2006 |
| WO | 2006102771 A1 | 10/2006 |
| WO | 2006110259 A1 | 10/2006 |
| WO | 2007060336 A2 | 5/2007 |

OTHER PUBLICATIONS

Ma, Jianglei, Method and system for OFDM code division multiplexing, Oct. 5, 2006, WO 2006102771 A1.

Taiwan Search Report—TW097100514—TIPO—Mar. 16, 2012.

Written Opinion—PCT/US08/050136—International Search Authority, European Patent Office—Jul. 16, 2008.

* cited by examiner

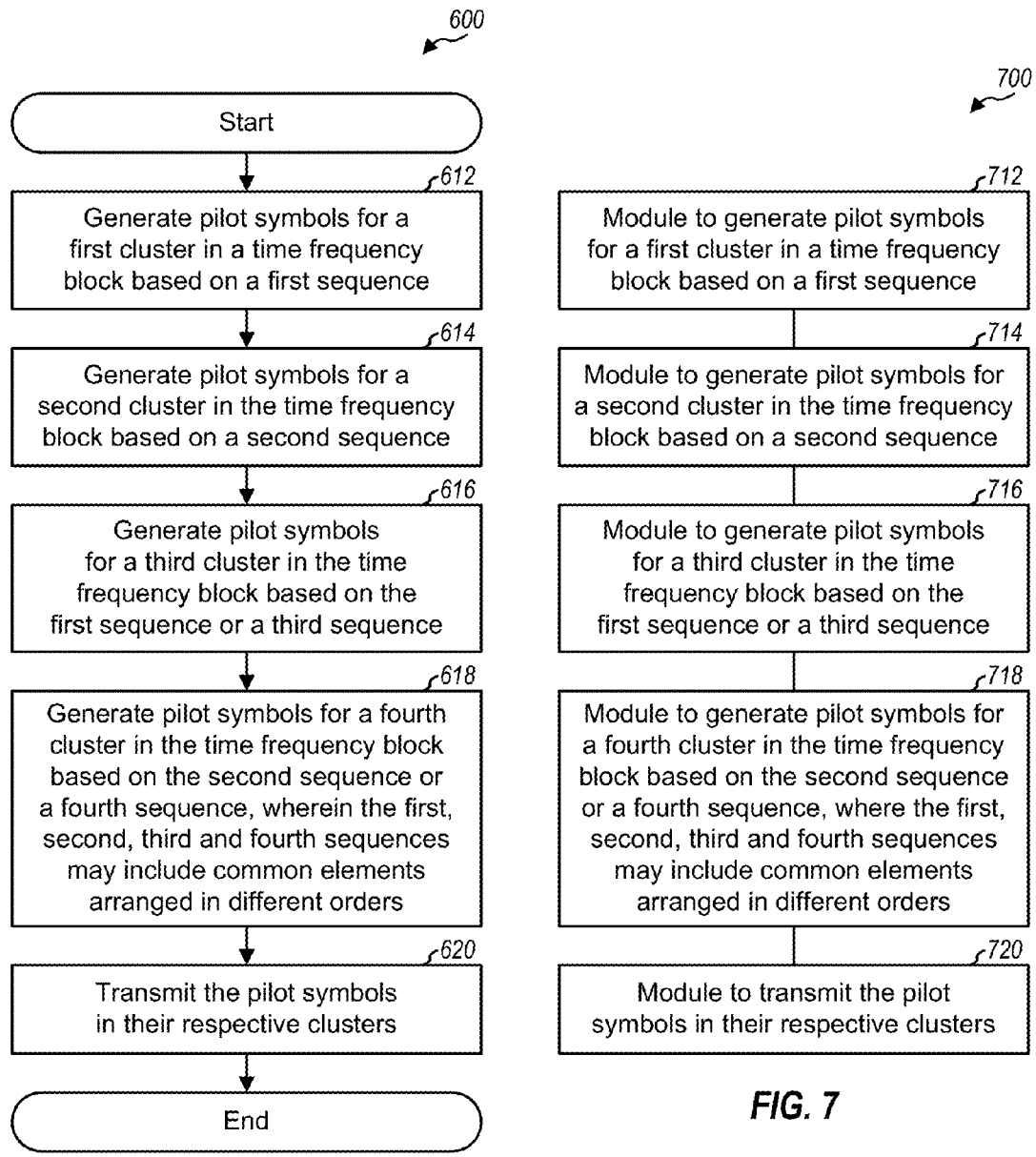

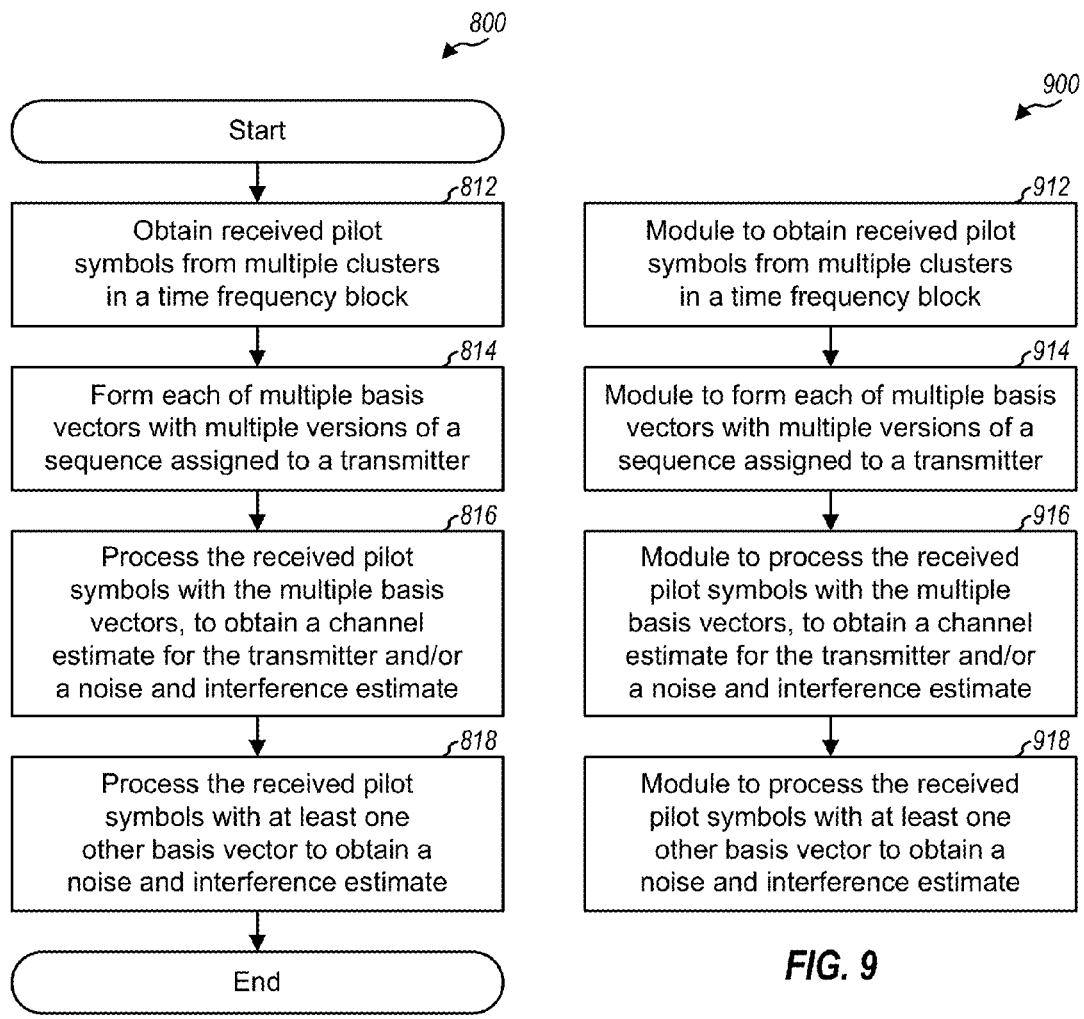

PILOT DESIGN FOR IMPROVED CHANNEL AND INTERFERENCE ESTIMATION

The present application for patent is a Continuation of U.S. patent application Ser. No. 13/402,537 entitled "PILOT DESIGN FOR IMPROVED CHANNEL AND INTERFERENCE ESTIMATION" filed Feb. 22, 2012, U.S. Pat. No. 8,432,985, which claims priority to U.S. patent application Ser. No. 11/691,243 entitled "PILOT DESIGN FOR IMPROVED CHANNEL AND INTERFERENCE ESTIMATION" filed Mar. 26, 2007, U.S. Pat. No. 8,130,867, which claims priority to U.S. Provisional Application Ser. No. 60/883,756, entitled "PILOT DESIGN FOR IMPROVED SIMPLIFIED CHANNEL AND INTERFERENCE ESTIMATION WITH DEDICATED PILOT TONES FOR OFDMA" filed Jan. 5, 2007, assigned to the assignee hereof and incorporated herein by reference.

BACKGROUND

I. Field

The present disclosure relates generally to communication, and more specifically to a pilot design for a wireless communication system.

II. Background

A wireless multiple-access communication system can support multiple users by sharing the available radio resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless multiple-access system may support multiple-input multiple-output (MIMO) transmission on the forward and/or reverse link. On the reverse link (or uplink), one or more terminals may send transmissions from multiple ($N_T$) transmit antennas at the terminal(s) to multiple ($N_R$) receive antennas at a base station. A MIMO channel formed by the $N_T$ transmit antennas and the $N_R$ receive antennas may be decomposed into $N_C$ spatial channels, where $N_C \leq \min\{N_T, N_R\}$. Improved performance (e.g., higher throughput and/or greater reliability) may be achieved by exploiting the spatial channels formed by the multiple transmit and receive antennas.

For MIMO transmission on the reverse link, the wireless channel between each terminal and the base station is normally estimated and used to recover the data transmission sent by the terminal via the wireless channel. Channel estimation is typically performed by sending pilot from each terminal and measuring the pilot at the base station. The pilot is made up of symbols that are known a priori by both the terminal and the base station. The base station can thus estimate the channel response for each terminal based on the pilot symbols received from that terminal and the known pilot symbols. Since pilot transmission represents overhead, it is desirable to minimize pilot transmission to the extent possible. However, the pilot transmission should be such that the base station can obtain a good channel estimate for each terminal.

There is therefore a need in the art for techniques to send pilot such that a good channel estimate may be derived.

SUMMARY

Techniques for transmitting pilot and for processing received pilot to obtain channel and interference estimates are described herein. A transmitter (e.g., a terminal) may generate pilot symbols for a first cluster in a time frequency block (or tile) based on a first sequence and may generate pilot symbols for a second cluster in the time frequency block based on a second sequence. The transmitter may further generate pilot symbols for a third cluster in the time frequency block based on the first sequence or a third sequence and may generate pilot symbols for a fourth cluster in the time frequency block based on the second sequence or a fourth sequence. Each cluster may cover a group of pilot symbols, typically adjacent to one another, in the time frequency block. The first, second, third and fourth sequences may include common elements arranged in different orders and may be considered as different versions of a single sequence. For example, the elements in the second sequence may be in a reverse order (or flipped) with respect to the elements in the first sequence. The transmitter may transmit the pilot symbols in their respective clusters in the time frequency block.

Multiple transmitters may share the time frequency block and may be assigned different sequences that are orthogonal to one another for each cluster in the time frequency block. Each transmitter may generate pilot symbols for each cluster based on the sequence assigned to that transmitter for that cluster.

A receiver (e.g., a base station) may obtain received pilot symbols from multiple clusters in the time frequency block. The receiver may form multiple basis vectors for a transmitter, with each basis vector being formed with multiple versions of a sequence assigned to that transmitter. A basis vector is a vector of elements used for processing received symbols. The multiple versions of the sequence may correspond to different orderings of the elements in the sequence and may be considered as different sequences. The receiver may form the multiple basis vectors further based on a particular channel model, e.g., a channel model with linearly varying time component and linearly varying frequency component. The receiver may process the received pilot symbols with the multiple basis vectors to obtain a channel estimate for the transmitter. The receiver may repeat the same processing (e.g., the generation of the basis vectors and the processing of the received pilot symbols with the basis vectors) for each transmitter sharing the time frequency block. The receiver may also obtain a noise and interference estimate based on the received pilot symbols and at least one basis vector not used for channel estimation.

Various aspects and features of the disclosure are described in further detail below.

BRIEF DESCRIPTION OF THE DRAWINGS

FIG. 6 shows a process performed by a transmitter to transmit pilot.

FIG. 7 shows an apparatus for transmitting pilot.

FIG. 8 shows a process performed by a receiver to process received pilot.

FIG. 9 shows an apparatus for processing received pilot.

DETAILED DESCRIPTION

The techniques described herein may be used for various communication systems that support MIMO transmission and utilize a form of frequency division multiplexing (FDM). For example, the techniques may be used for systems that utilize orthogonal FDM (OFDM), single-carrier FDM (SC-FDM), etc. OFDM and SC-FDM partition the system bandwidth into multiple (K) orthogonal subcarriers, which are also referred to as tones, bins, etc. Each subcarrier may be modulated with data. In general, modulation symbols are sent in the frequency domain with OFDM and in the time domain with SC-FDM. The techniques may also be used for transmissions on the reverse link (or uplink) as well as the forward link (or downlink). For clarity, the techniques are described below for transmissions on the reverse link.

Figure 1:
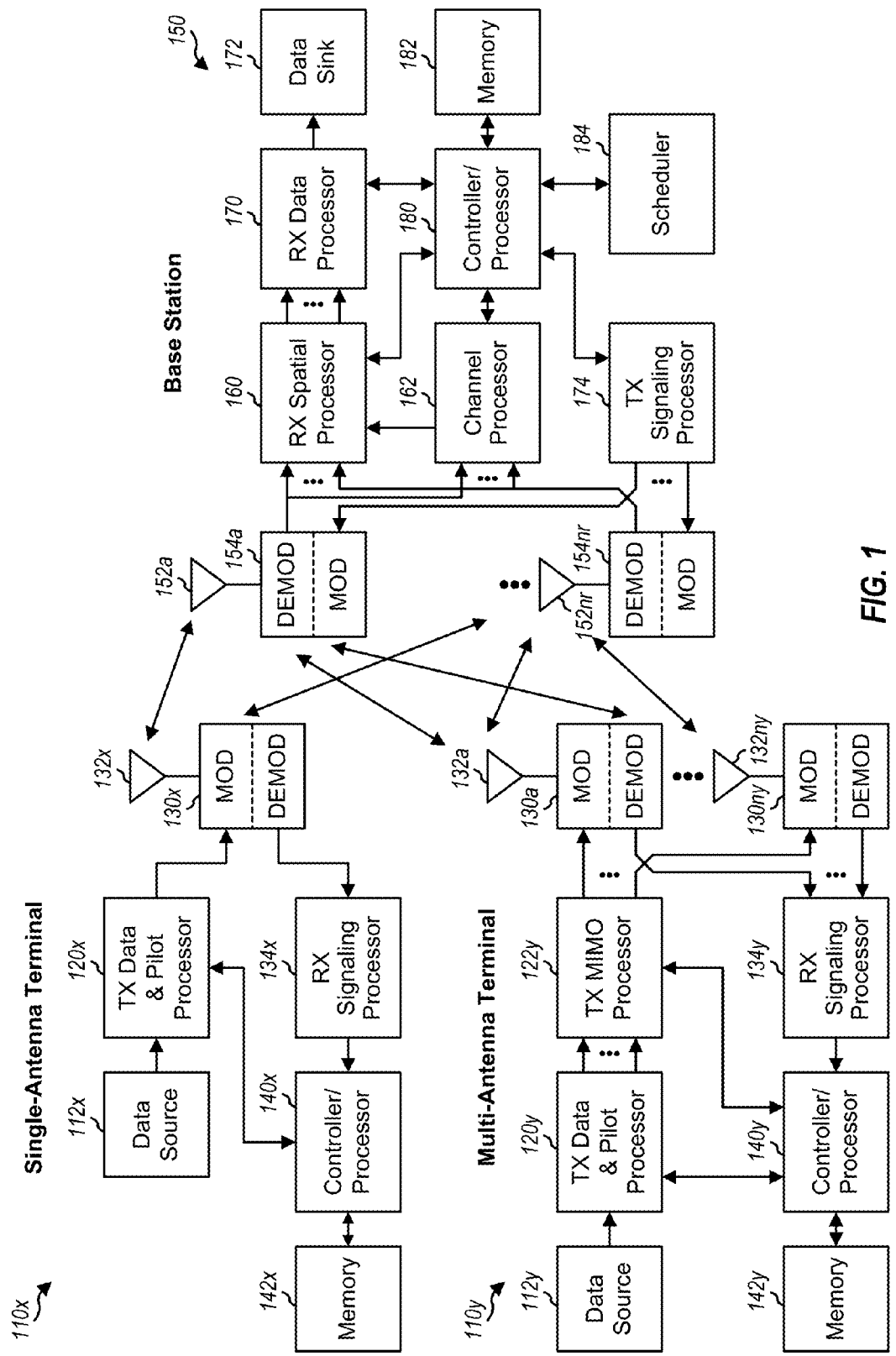
FIG. 1 shows a block diagram of two terminals and a base station.

FIG. 1 shows a block diagram of a design of two terminals 110x and 110y and a base station 150 in a wireless communication system. A terminal may also be referred to as a user equipment (UE), a mobile station, an access terminal, a subscriber unit, a station, etc. A terminal may be a cellular phone, a personal digital assistant (PDA), a wireless communication device, a handheld device, a wireless modem, a laptop computer, a cordless phone, etc. A base station may also be referred to as a Node B, an evolved Node B (eNode B), an access point, etc. In FIG. 1, terminal 110x is equipped with a single antenna, terminal 110y is equipped with multiple antennas, and base station 150 is equipped with multiple antennas. Each antenna may be a physical antenna or an antenna array. For simplicity, FIG. 1 shows only processing units for data transmission on the reverse link and signaling transmission on the forward link.

At each terminal 110, a transmit (TX) data and pilot processor 120 may receive traffic data from a data source 112, process (e.g., format, encode, interleave, and symbol map) the traffic data, and generate data symbols. Processor 120 may also generate and multiplex pilot symbols with the data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both the terminals and the base station.

At terminal 110y, a TX MIMO processor 122y may perform transmitter spatial processing on the data and pilot symbols based on direct MIMO mapping, precoding, beamforming, etc. A data symbol may be sent from one antenna for direct MIMO mapping or from multiple antennas for precoding and beamforming. Processor 122y may provide $N_Y$ streams of output symbols to $N_Y$ modulators (MOD) 130a through 130ny. At terminal 110x, processor 120x may provide a single output symbol stream to a modulator 130x. Each modulator 130 may perform modulation (e.g., for OFDM, SC-FDM, etc.) on the output symbols to obtain output chips. Each modulator 130 may further process (e.g., convert to analog, filter, amplify, and upconvert) its output chips to generate a reverse link signal. At terminal 110x, a single reverse link signal from modulator 130x may be transmitted from antenna 132x. At terminal 110y, $N_Y$ reverse link signals from modulators 130a through 130ny may be transmitted via $N_Y$ antennas 132a through 132ny, respectively.

At base station 150, $N_R$ antennas 152a through 152nr may receive the reverse link signals from terminals 110x and 110y and possibly other terminals. Each antenna 152 may provide a received signal to a respective demodulator (DEMOD) 154. Each demodulator 154 may process (e.g., filter, amplify, downconvert, and digitize) its received signal to obtain samples and may further perform demodulation (e.g., for OFDM, SC-FDM, etc.) on the samples to obtain received symbols. Each demodulator 154 may provide received data symbols to a receive (RX) spatial processor 160 and may provide received pilot symbols to a channel processor 162. Channel processor 162 may estimate the response of the wireless channel from each terminal 110 to base station 150 as well as noise and interference based on the received pilot symbols. RX spatial processor 160 may perform MIMO detection on the received data symbols with channel estimates and noise and interference estimates from channel processor 162 to obtain data symbol estimates. An RX data processor 170 may process (e.g., deinterleave and decode) the data symbol estimates and provide decoded data to a data sink 172.

Base station 150 may send traffic data and signaling (e.g., assignments of time frequency resources) to the terminals. The signaling may be processed by a TX signaling processor 174 and further processed by modulators 154a through 154nr to generate $N_R$ forward link signals, which may be transmitted via $N_R$ antennas 152a through 152nr. At each terminal 110, the forward link signals from base station 150 may be received by one or more antennas 132, processed by one or more demodulators 130, and further processed by an RX signaling processor 134 to recover the signaling sent by base station 150.

Controllers/processors 140x, 140y, and 180 may control the operation of various processing units at terminals 110x and 110y and base station 150, respectively. Memories 142x, 142y, and 182 may store data and program codes for terminals 110x and 110y and base station 150, respectively. A scheduler 184 may schedule terminals for transmission on the forward and/or reverse link.

Figure 2:
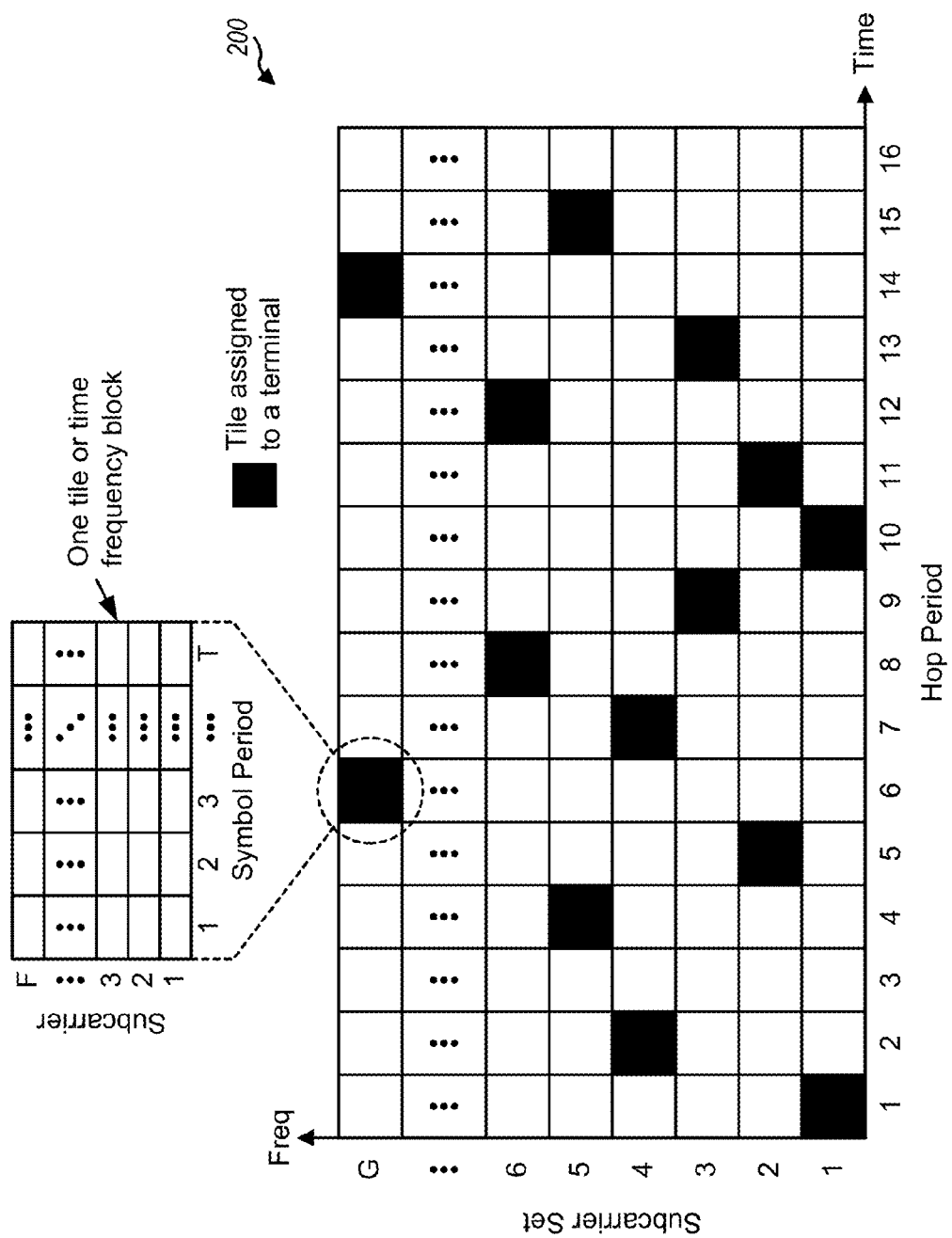
FIG. 2 shows a tile structure.

FIG. 2 shows a tile structure 200 that may be used for the forward and/or reverse link. The time frequency resources available for a given link may be partitioned into tiles, which may also be referred to as time frequency blocks, resource blocks, hop regions, etc. Each tile may cover multiple (F) subcarriers in multiple (T) symbol periods, where F and T may each be any integer value. The F subcarriers in a given tile may be consecutive subcarriers or may be distributed across the K total subcarriers. Each tile includes F·T resource units, where a resource unit is one subcarrier in one symbol period. F·T modulation symbols may be sent in the F·T resource units in each tile. Each tile may be assigned to one or more terminals for data transmission.

FIG. 2 also shows a frequency hopping scheme that may be used for the forward and/or reverse link. Frequency hopping may provide frequency diversity against deleterious path effects and randomization of interference. With frequency hopping, a terminal may be assigned tiles in different parts of the system bandwidth in different hop periods. A hop period is the time duration of one tile and spans T symbol periods.

Data and pilot may be sent in various manners in a tile. In one design, data and pilot symbols are sent in different resource units. The pilot symbols may also be sent based on a pilot pattern that indicates specific resource units to use for the pilot symbols. In general, a pilot pattern may include any number of pilot symbols, and the pilot symbols may be located anywhere within a tile. The number of pilot symbols may be selected based on a tradeoff between pilot overhead and channel estimation performance. The spacing of the pilot symbols across frequency may be selected based on expected delay spread of the wireless channel. Smaller frequency separation between pilot symbols may be used to handle larger delay spread. The spacing of the pilot symbols across time may be selected based on expected Doppler spread of the wireless channel. Smaller time separation between pilot symbols may be used to handle larger Doppler spread.

The pilot symbols may also be placed to support spatial multiplexing techniques such as MIMO and/or Spatial Division Multiple Access (SDMA). With spatial multiplexing, multiple data streams may be transmitted simultaneously via multiple spatial channels or layers formed by multiple transmit antennas and multiple receive antennas. To support spatial multiplexing, the pilot symbols may be arranged in clusters within a tile. The number of pilot symbols (M) in each cluster may be equal to or larger than the spatial rank to be supported. Spatial rank refers to the number of spatial channels, and hence the number of data streams that may be transmitted in parallel. The pilot symbols in each cluster may occupy a contiguous region in time and frequency such that, for each terminal, the variations of the wireless channel across the pilot symbols in one cluster are as small as possible.

Figure 3A:
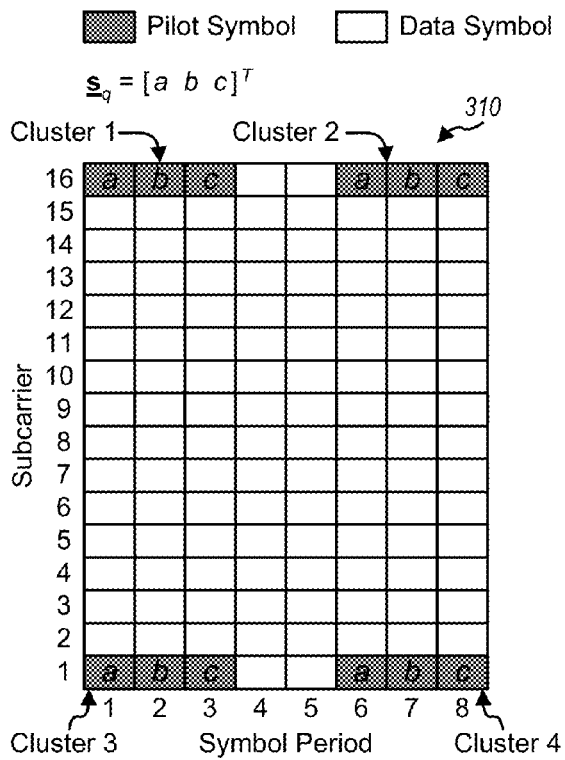
FIGS. 3A through 3D show designs of four pilot patterns.

FIG. 3A shows a design of a pilot pattern 310 for a 16×8 tile that covers F=16 subcarriers in T=8 symbol periods. In this design, the tile includes 12 pilot symbols that are arranged in four clusters located at four corners of the tile. The four clusters may be given indices of 1, 2, 3 and 4, as shown in FIG. 3A. Each cluster includes M=3 pilot symbols sent on one subcarrier in three consecutive symbol periods. The three pilot symbols in each cluster may be used for channel estimation for up to three spatial channels.

Figure 3B:
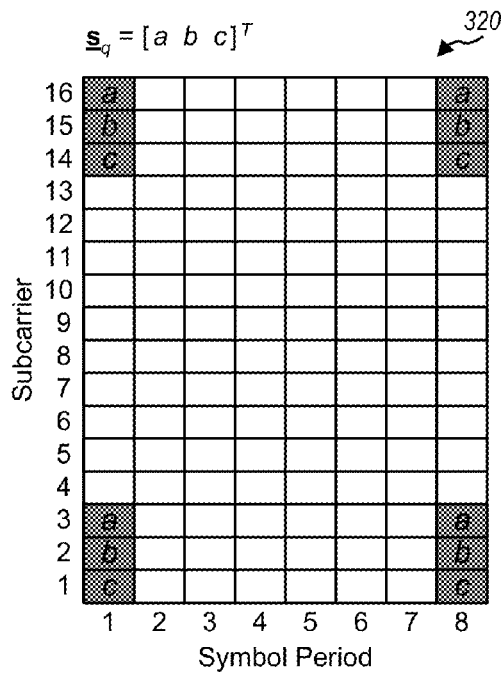

FIG. 3B shows a design of a pilot pattern 320 for a 16×8 tile. In this design, the tile includes 12 pilot symbols that are arranged in four clusters located at four corners of the tile. Each cluster includes M=3 pilot symbols sent on three consecutive subcarriers in one symbol period. The three pilot symbols in each cluster may be used for channel estimation for up to three spatial channels.

Figure 3C:
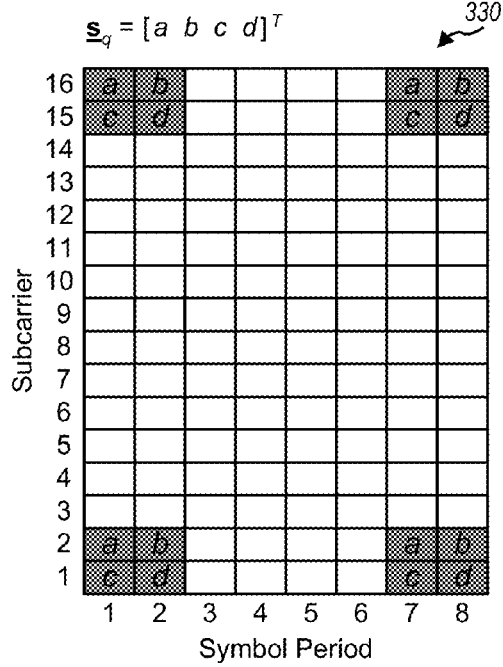

FIG. 3C shows a design of a pilot pattern 330 for a 16×8 tile. In this design, the tile includes 16 pilot symbols that are arranged in four clusters located at four corners of the tile. Each cluster includes M=4 pilot symbols sent on two consecutive subcarriers in two consecutive symbol periods. The four pilot symbols in each cluster may be used for channel estimation for up to four spatial channels.

Figure 3D:
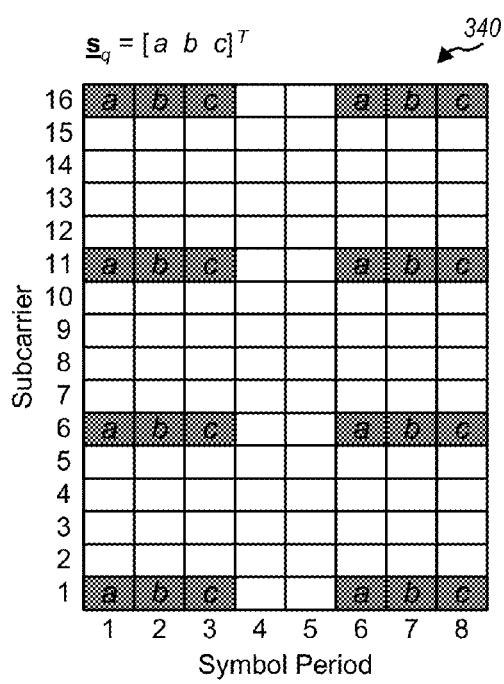

FIG. 3D shows a design of a pilot pattern 340 for a 16×8 tile. In this design, the tile includes 24 pilot symbols that are arranged in eight clusters located in four rows of the tile. Each cluster includes M=3 pilot symbols sent on one subcarrier in three consecutive symbol periods. The three pilot symbols in each cluster may be used for channel estimation for up to three spatial channels.

FIGS. 3A to 3D show four example pilot patterns. Various other pilot patterns may also be defined. In general, a pilot pattern may include any number of clusters, and each cluster may include any number of pilot symbols. Furthermore, the clusters and pilot symbols may be arranged in any manner in a tile. For clarity, much of the description below assumes the use of pilot pattern 310 in FIG. 3A.

In general, one or more terminals may share a given tile. If the tile has clusters of M pilot symbols, then up to M data streams may be transmitted on up to M spatial channels or layers. A terminal with a single antenna (e.g., terminal 110$x$ in FIG. 1) may transmit a single data stream on a single spatial channel. A terminal with multiple antennas (e.g., terminal 110$y$ in FIG. 1) may transmit multiple data streams on multiple spatial channels.

For clarity, much of the following description assumes that Q terminals share a given tile, where $1 \leq Q \leq M$, and that each terminal transmits one data stream on one spatial channel. The processing for this tile is described below.

The base station may obtain F·T received symbols from the tile for the Q terminals. The received symbols may be expressed as:

$$\underline{y} = \sum_{q=1}^{Q} \Delta_q \underline{h}_q \circ \underline{z}_q + \underline{n}_0, \quad \text{Eq (1)}$$

where $\underline{z}_q$ is an F·T×1 vector of modulation symbols transmitted by terminal q on the F·T resource units in the tile, $\underline{h}_q$ is an F·T×1 vector of complex channel gains for the F·T resource units in the tile for terminal q, $\Delta_q^2$ is a scalar for a power offset for terminal q, $\underline{y}$ is an F·T×1 vector of received symbols for the F·T resource units in the tile, $\underline{n}_0$ is an F·T×1 vector of noise and interference for the tile, and "∘" denotes an element-by-element multiply.

In equation (1), the first F elements of each vector correspond to the F subcarriers in the first symbol period of the tile, the next F elements correspond to the F subcarriers in the second symbol period, and so on, and the last F elements correspond to the F subcarriers in the last symbol period. $\underline{h}_q$ contains the frequency-domain complex channel gains for terminal q, which may be assumed to be complex Gaussian random variable with zero mean and a known covariance matrix. The channel gains may be assumed to be independent among the Q terminals. For simplicity, the noise and interference $\underline{n}_0$ may be assumed to be additive white Gaussian noise (AWGN) with a zero mean vector and a covariance matrix of $\sigma^2 I$, where $\sigma^2$ is the variance of the noise and interference and I is the identity matrix.

The base station may estimate the channel gains for each terminal as well as the noise and interference based on the received pilot symbols. The base station may perform channel estimation based on an assumption that the statistical properties of the wireless channel for each terminal are known and that the channel gains across the tile for each terminal are correlated.

A covariance matrix for each terminal q, where $q \in \{1, \ldots, Q\}$, may be approximated as follows:

$$E\{\underline{h}_q \, \underline{h}_q^H\} \approx \sum_{i=1}^{3} \lambda_{i,q} \underline{u}_i \underline{u}_i^H, \quad \text{Eq (2)}$$

where $\underline{u}_i$ is the i-th approximate eigenvector for the channel for terminal q, $\lambda_{i,q}$ is the i-th eigenvalue for the channel for terminal q, $E\{\}$ denotes an expectation operation, and "$H$" denotes a Hermitian or complex transpose.

Equation (2) is based on an observation that, for cases of practical interest, the covariance matrix of a terminal has at most three significant eigenvalues and may be approximated with three eigenvectors $\underline{u}_1$, $\underline{u}_2$ and $\underline{u}_3$. These three approximate eigenvectors have dimension of F·T×1 and may be used instead of the actual eigenvectors for channel estimation for terminal q across the tile. Furthermore, for the cases of practical interest, the first eigenvalue $\lambda_{1,q}$ is typically at least one order of magnitude larger than the other two eigenvalues $\lambda_{2,q}$ and $\lambda_{3,q}$.

The three approximate eigenvectors may be expressed as:

$$u_1 = u_{T,0} \otimes u_{F,0}, \; u_2 = u_{T,0} \otimes u_{F,1}, \; u_3 = u_{T,1} \otimes u_{F,0}, \quad \text{Eq (3)}$$

where $$u_{F,0} = \frac{1}{\sqrt{F}} [1, \ldots, 1]^T$$

$F \times 1$ vector, $$u_{F,1} = \sqrt{\frac{3}{F \cdot (F^2 - 1)}} \, [-(F-1):2:(F-1)]^T$$

$F \times 1$ vector, $$u_{T,0} = \frac{1}{\sqrt{T}} [1, \ldots, 1]^T$$

$T \times 1$ vector, $$u_{T,1} = \sqrt{\frac{3}{T \cdot (T^2 - 1)}} \, [-(T-1):2:(T-1)]^T$$

$T \times 1$ vector, and

"$\otimes$" denotes a *Kronecker* product.

For an $n \times 1$ vector $a_{n \times 1} = [a_1, a_2, \ldots, a_n]^T$ and an $m \times 1$ vector $b_{m \times 1} = [b_1, b_2, \ldots, b_m]^T$, where "$T$" denotes a transpose, the Kronecker product $c_{mn \times 1} = a_{n \times 1} \otimes b_{m \times 1}$ may be given as:

$$c_{mn \times 1} = \begin{bmatrix} a_1 b_{m \times 1} \\ a_2 b_{m \times 1} \\ \vdots \\ a_n b_{m \times 1} \end{bmatrix}$$

$$= \begin{bmatrix} a_1 b_1, a_1 b_2, \ldots, a_1 b_m, a_2 b_1, a_2 b_2, \ldots, \\ a_2 b_m, \ldots, a_n b_1, a_n b_2, \ldots, a_n b_m \end{bmatrix}^T.$$

$c_{mn \times 1}$ is an $mn \times 1$ vector containing the product of each element of $a_{n \times 1}$ with each element of $b_{m \times 1}$.

In equation (3), $u_{F,0}$ is a vector of all ones, scaled by a constant to achieve unit power for $u_{F,0}$. $u_{F,1}$ is a vector with values from $-(F-1)$ to $(F-1)$ in steps of 2, scaled by a constant to achieve unit power for $u_{F,1}$. $u_{F,1}$ varies linearly across the F subcarriers of the tile. $u_{T,0}$ is a vector of all ones, scaled by a constant to achieve unit power for $u_{T,0}$. $u_{T,1}$ is a vector with values from $-(T-1)$ to $(T-1)$ in steps of 2, scaled by a constant to achieve unit power for $u_{T,1}$. $u_{T,1}$ varies linearly across the T symbol periods of the tile.

$u_1$ is an $F \cdot T \times 1$ vector of all ones, scaled by a constant to achieve unit power for $u_1$. $u_2$ is an $F \cdot T \times 1$ vector containing T sequences of the F elements in $u_{F,1}$, scaled by a constant to achieve unit power for $u_2$. $u_3$ is an $F \cdot T \times 1$ vector containing F repetitions of each of the T elements in $u_{T,1}$, scaled by a constant to achieve unit power for $u_3$. $u_1$ models DC or average component. $u_2$ models variation of the channel in frequency. $u_3$ models variation of the channel in time.

The channel response of each terminal q across the tile may be modeled as a random function of frequency and time, $\xi_q(f,t)$. This function may be approximated by the first three terms of the Taylor series expansion, as follows:

$$\xi_q(f, t) \approx \xi_q(f_0, t_0) + (f - f_0) \cdot \left. \frac{\partial \xi_q(f, t)}{\partial f} \right|_{(f_0, t_0)} + \quad \text{Eq (4)}$$

$$(t - t_0) \cdot \left. \frac{\partial \xi_q(f, t)}{\partial t} \right|_{(f_0, t_0)}.$$

In equation (4), the 2-dimensional (2D) function $\xi_q(f,t)$ is approximated with (i) a first term for the value of $\xi_q(f,t)$ at the origin, or $\xi_q(f_0, t_0)$, (ii) a second term for a linear function across frequency, or $S_{F,q} \cdot (f-f_0)$, and (iii) a third term for a linear function across time, or $S_{T,q} \cdot (t-t_0)$. The slopes $S_{F,q}$ and $S_{T,q}$ of the linear functions across frequency and time are determined by the slope of $\xi_q(f,t)$ with respect to frequency and time, respectively, at the origin.

Based on the channel model shown in equation (4), the channel response of terminal q may be expressed as:

$$h_q(n_f, n_t) \approx \alpha_q + \beta_{F,q} \cdot (n_f - n_{f0}) + \beta_{T,q} \cdot (n_t - n_{t0}), \quad \text{Eq (5)}$$

where $\alpha_q$ is an average channel gain, which corresponds to the term $\xi_q(f_0, t_0)$, $\beta_{F,q}$ is the slope of the linear function across frequency for terminal q, $\beta_{T,q}$ is the slope of the linear function across time for terminal q, and $h_q(n_f, n_t)$ is a 2D function for the channel response of terminal q.

As shown in equation (5), the channel response of terminal q across the tile may be characterized by three complex parameters $\alpha_q$, $\beta_{F,q}$ and $\beta_{T,q}$. The center of the tile may be given as $(n_{f0}, n_{t0})$, where $n_{f0} = (F+1)/2$ and $n_{t0} = (T+1)/2$. The channel response for a symbol at discrete coordinates $(n_f, n_t)$ may be obtained as shown in equation (5).

A pilot pattern may include P total pilot symbols that may be arranged in four clusters, with each cluster including M pilot symbols, so that P=4M. The pilot symbols may be placed at locations that are symmetric about the center of the tile, e.g., as shown in FIGS. 3A through 3D. If each terminal transmits one data stream on one spatial channel, then the number of terminals that can share the tile is limited to M, or Q≤M.

The Q terminals may share a cluster, and each of the Q terminals may simultaneously transmit M pilot symbols in that cluster. Each terminal may scramble or spread its M pilot symbols with a scrambling sequence assigned to that terminal. The scrambling sequences for the Q terminals may be denoted as $s_q$, for $q=1, \ldots, Q$, and should be orthogonal to one another. The scrambling sequences may also be referred to as spreading sequences, orthogonal sequences, pilot sequences, sequences, etc. The scrambling sequences may have unit modulus elements and should be of length of M. In one design, M scrambling sequences are defined based on M columns of an M×M Fourier matrix, with each scrambling sequence containing M elements of one column of the Fourier matrix. The element in the n-th row and m-th column of the M×M Fourier matrix may be given as $e^{-2\pi \cdot n \cdot m / M}$, for $n=0, \ldots, M-1$ and $m=0, \ldots, M-1$. The M scrambling sequences may also be defined in other manners. In any case, Q scrambling sequences may be selected from among the M available scrambling sequences. In one design, each terminal is assigned one scrambling sequence and uses the same scrambling sequence for all clusters in the tile. In another design, each terminal may use different scrambling sequences for different clusters in the tile.

The pilot symbols transmitted by terminal q in the tile may be expressed as:

$$r_{1,q} = \frac{1}{\sqrt{P}} \cdot 1_{4\times 1} \otimes s_q, \qquad \text{Eq (6)}$$

where $1_{4\times 1}$ is a 4×1 vector of all ones, and $r_{1,q}$ is a P×1 vector of pilot symbols transmitted by terminal q in the tile.

The first M elements of $r_{1,q}$ are for pilot symbols sent in cluster 1 in the upper-left corner of the tile, the next M elements are for pilot symbols sent in cluster 2 in the upper-right corner, the next M elements are for pilot symbols sent in cluster 3 in the lower-left corner, and the last M elements are for pilot symbols sent in cluster 4 in the lower-right corner. The pilot vectors $r_{1,q}$ for terminals 1 through Q are orthonormal.

FIG. 3A shows the transmitted pilot symbols for pilot pattern 310 with scrambling sequence $s_q = [a\ b\ c]^T$, where a, b and c are three elements of the scrambling sequence and may have any complex values. The three elements a, b and c in $s_q$ are applied to three pilot symbols from left to right in each cluster in the tile.

FIG. 3B shows the transmitted pilot symbols for pilot pattern 320 with scrambling sequence $s_q = [a\ b\ c]^T$. The three elements a, b and c in $s_q$ are applied to three pilot symbols from top to bottom in each cluster in the tile.

FIG. 3C shows the transmitted pilot symbols for pilot pattern 330 with scrambling sequence $s_q = [a\ b\ c\ d]^T$. The four elements a, b, c and d in $s_q$ are applied to four pilot symbols in a z-pattern in each cluster in the tile.

FIG. 3D shows the transmitted pilot symbols for pilot pattern 340 with scrambling sequence $s_q = [a\ b\ c]^T$. The three elements a, b and c in $s_q$ are applied to three pilot symbols from left to right in each cluster in the tile.

A set of basis vectors may be defined for each terminal q, as follows:

$$r_{i,q} = \frac{1}{\sqrt{P}} \cdot v_i \otimes s_q, \qquad \text{Eq (7)}$$

$$\text{where } v_1 = \begin{bmatrix} 1 \\ 1 \\ 1 \\ 1 \end{bmatrix}, v_2 = \begin{bmatrix} -1 \\ -1 \\ 1 \\ 1 \end{bmatrix}, v_3 = \begin{bmatrix} -1 \\ 1 \\ -1 \\ 1 \end{bmatrix}, v_4 = \begin{bmatrix} 1 \\ -1 \\ -1 \\ 1 \end{bmatrix}.$$

Figure 4:
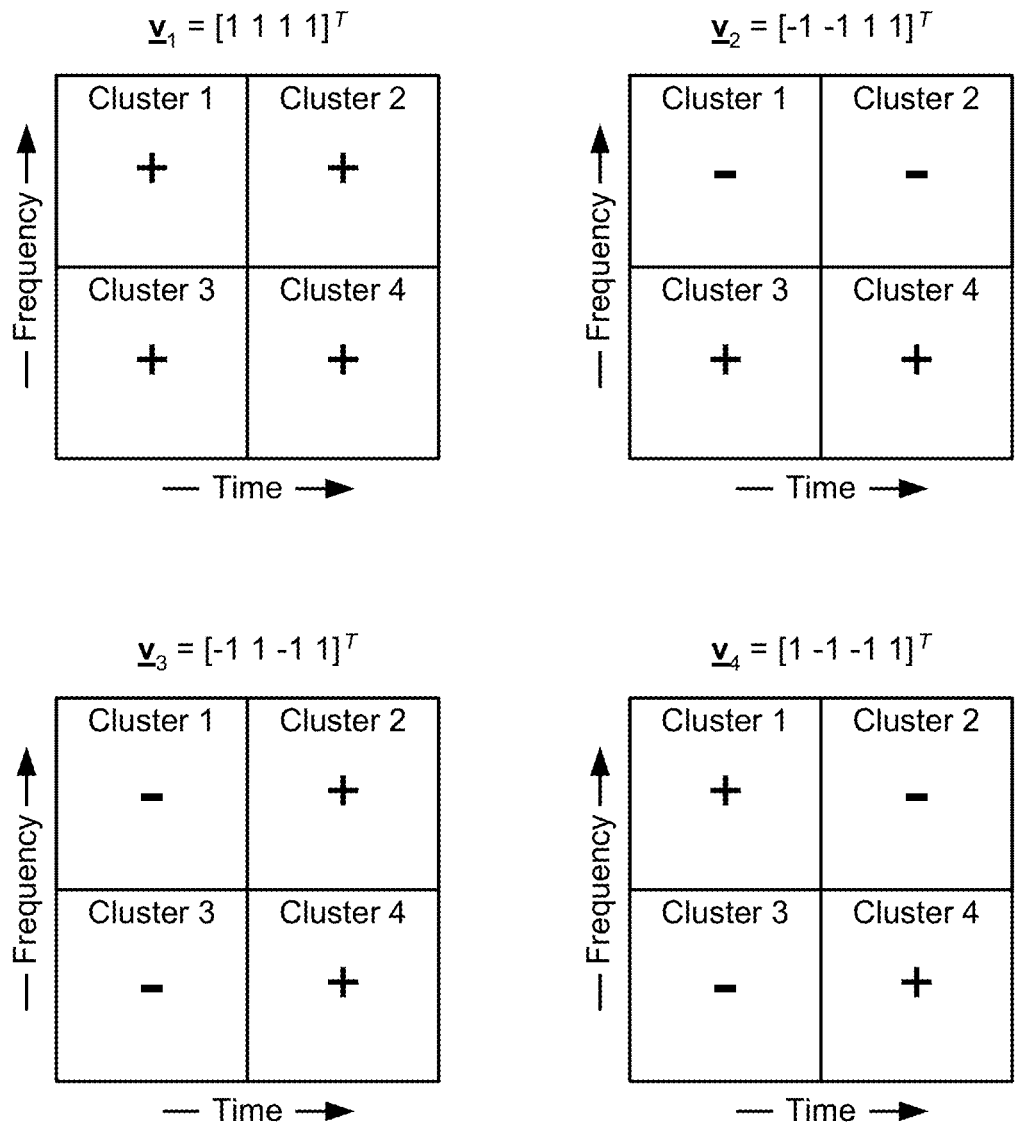
FIG. 4 illustrates different combining options for four pilot clusters.

FIG. 4 illustrates vectors $v_1$ through $v_4$. The four vectors $v_1$ through $v_4$ have different combinations of signs for the four clusters in the tile and represent different combining options for the pilot symbols received in the four clusters, as described below.

Each terminal q is associated with a set of four P×1 basis vectors $r_{1,q}, r_{2,q}, r_{3,q}$ and $r_{4,q}$. $r_{1,q}$ contains the transmitted pilot symbols. $r_{2,q}$ is generated with $v_2$ and is used to detect channel variation across frequency. $r_{3,q}$ is generated with $v_3$ and is used to detect channel variation across time. $r_{4,q}$ is generated with $v_4$ and may be used for noise and interference estimation.

If the number of degrees of freedom of the channels for the Q terminals sharing the tile is lower than the total number of pilot symbols in the tile, then pilot symbols not used to estimate parameters of the channels may be used to estimate noise and interference power in the tile. The observation space has P dimensions corresponding to the P total pilot symbols in the tile. In the design described above, the channel of each terminal may be characterized by three parameters, and 3Q dimensions may be used to estimate the channel parameters for all Q terminals. The remaining P−3Q dimensions of the observation space may be used to estimate noise and interference power.

The noise and interference may be estimated as the power of the projection of a received signal onto dimensions not occupied by pilot signals transmitted by the Q terminals. The received signal may be projected onto the basis vectors for all M available scrambling sequences, as follows:

$$w_{i,q} = r_{i,q}^H x, \text{ for } i=1,\ldots,4 \text{ and } q=1,\ldots,M, \qquad \text{Eq (8)}$$

where x is a P×1 vector with P received pilot symbols in the tile, and $w_{i,q}$ is the result of the projection of received vector x onto basis vector $r_{i,q}$.

For each terminal q, equation (8) effectively despreads the M received pilot symbols in each cluster with the scrambling sequence $s_q$ for that terminal q. Equation (8) further accumulates the four despread results for the four clusters in different manners for different basis vectors. Referring to FIG. 4, for $r_{1,q}$, the despread results for the four clusters are summed to obtain $w_{1,q}$, which is indicative of an average channel gain for terminal q. For $r_{2,q}$, the despread results for the two upper clusters are subtracted from the despread results for the two lower clusters to obtain $w_{2,q}$, which is indicative of channel variation across frequency for terminal q. For $r_{3,q}$, the despread results for the two left clusters are subtracted from the despread results for the two right clusters to obtain $w_{3,q}$, which is indicative of channel variation across time for terminal q. For $r_{3,q}$, the despread results for the upper-right and lower-left clusters are subtracted from the despread results for upper-left and lower-right clusters to obtain $w_{4,q}$.

The noise and interference power may be estimated as follows:

$$\hat{\sigma}^2 = \frac{1}{4M - 3Q} \cdot \left( \sum_{q=1}^{Q} |w_{4,q}|^2 + \sum_{i=1}^{4} \sum_{q=Q+1}^{M} |w_{i,q}|^2 \right), \qquad \text{Eq (9)}$$

where $\hat{\sigma}^2$ is the estimated noise and interference power.

In equation (9), the first summation captures the power of the projection of x onto $r_{4,q}$, which is not used for channel estimation for any terminal. The first summation may be used as an estimate of the noise and interference power but may include channel modeling error if the channel of each terminal does not vary linearly across the tile. The double summation captures the power of the projection of x onto $r_{i,q}$ generated with scrambling sequences not used by any of the Q terminals. The double summation is present if Q<M.

A channel estimate may be derived for each terminal q based on minimum mean square error (MMSE) criterion, as follows:

$$\hat{h}_q = E\{h_q x^H\}(E\{xx^H\})^{-1} x, \qquad \text{Eq (10)}$$

where $\hat{h}_q$ is an F·T×1 vector for the channel estimate for terminal q. $\hat{h}_q$ is an estimate of $h_q$ in equation (1).

Using the channel model shown in equation (2), the channel estimate for each terminal q may be expressed as:

$$\Delta_q \hat{h}_q = \sum_{i=1}^{3} \frac{\Delta_q^2 \cdot \lambda_{i,q} \cdot \rho_i}{\Delta_q^2 \cdot \lambda_{i,q} \cdot \rho_i^2 + \hat{\sigma}^2} \cdot w_{i,q} u_i, \quad \text{Eq (11)}$$

where $\rho_1 = \left(\sqrt{\frac{F \cdot T}{P}}\right)^{-1}$, $\rho_2 = \left(\sqrt{\frac{F \cdot T \cdot (F^2 - 1)}{3P}} \cdot \frac{1}{F - \theta_F}\right)^{-1}$, and $\rho_3 = \left(\sqrt{\frac{F \cdot T \cdot (T^2 - 1)}{3P}} \cdot \frac{1}{T - \theta_T}\right)^{-1}$.

$\theta_T$ and $\theta_F$ identify the center of the pilot clusters in the tile and are thus dependent on the placement of the pilot symbols in the tile. The center of the upper-left cluster may be given by $$\left(\frac{\theta_T + 1}{2}, \frac{\theta_F + 1}{2}\right).$$

For example, $\theta_F=1$ if the pilot symbols are placed in the topmost row of the tile, $\theta_F=3$ if the pilot symbols are placed in the second topmost row, etc.

In equation (11), the channel estimate $\hat{h}_q$ for terminal q may be obtained based on a sum of three weighted vectors, where $u_1$, $u_2$ and $u_3$ are defined in equation (3). The weight for $u_i$ is determined by parameter $\rho_i$, eigenvalue $\lambda_{i,q}$, power offset $\Delta_q^2$, noise and interference estimate $\hat{\sigma}^2$, and projection result $w_{i,q}$. The eigenvalues $\lambda_{i,q}$ may be estimated in any manner known in the art.

An assumption used in deriving the channel estimate is that the channel of each terminal is constant for the M pilot symbols in each cluster. If the channel varies across the M pilot symbols in each cluster, then the descrambling/despreading may have residual errors that may degrade the channel estimate.

To see the effects of despreading errors, equation (8) may be expanded as follows:

$$w_{i,q} = r_{i,q}^H x \quad \text{Eq (12)}$$

$$= r_{i,q}^H \left[\sum_{k=1}^{Q} \Delta_k \tilde{h}_k \circ r_{1,k} + \tilde{n}_0\right]$$

$$= \Delta_q r_{i,q}^H (\tilde{h}_q \circ r_{1,q}) + r_{i,q}^H \sum_{k=1, k \neq q}^{Q} \Delta_k \tilde{h}_k \circ r_{1,k} + r_{i,q}^H \tilde{n}_0,$$

where $\tilde{h}_k$ is a P×1 vector of complex channel gains for terminal k for the P pilot symbols, and $\tilde{n}_0$ is a P×1 vector of noise and interference for the P pilot symbols. $\tilde{h}_k$ contains P elements in $h_k$ for the P pilot symbols, and $\tilde{n}_0$ contains P elements in $n_0$ for the P pilot symbols.

As shown in equation (12), projection result $w_{i,q}$ for terminal q includes a component from terminal q as well as contributions from other terminals and noise. The contribution $n_{i,q,k}$ from another terminal k in the projection result $w_{i,q}$ for terminal q may be expressed as:

$$n_{i,q,k} = r_{i,q}^H (\tilde{h}_k \circ r_{1,k}), \text{ where } k \neq q. \quad \text{Eq (13)}$$

If the despreading is perfect, then $n_{i,q,k}=0$ for all other terminals, and no contributions from other terminals appear in the projection result $w_{i,q}$ for terminal q. However, the contributions from other terminals are non-zero when their channels vary across the M pilot symbols in a cluster.

Based on the channel model in equation (5), the channel response of each terminal k may be expressed as:

$$\tilde{h}_k \approx \alpha_k \cdot (v_1 \otimes 1_{M \times 1}) + 2\beta_{F,k} \cdot (n_f - n_{f0}) \cdot (v_2 \otimes 1_{M \times 1}) + 2\beta_{T,k} \cdot v_T, \quad \text{Eq (14)}$$

For the pilot pattern shown in FIG. 3A, $v_T$ may be given as:

$$v_T = \begin{bmatrix} 1 \\ 1 \end{bmatrix} \otimes \begin{bmatrix} -7 \\ -5 \\ -3 \\ 3 \\ 5 \\ 7 \end{bmatrix} = 5 v_3 \otimes 1_{M \times 1} + v_1 \otimes \begin{bmatrix} -2 \\ 0 \\ 2 \end{bmatrix}. \quad \text{Eq (15)}$$

Combining equations (6) and (14), term $\sqrt{P} \cdot \tilde{h}_k \circ r_{1,q}$ may be expressed as:

$$\sqrt{P} \cdot \tilde{h}_k \circ r_{1,q} \approx \quad \text{Eq (16)}$$

$$\alpha_k \cdot (v_1 \otimes s_k) + 2\beta_{F,k} \cdot (n_f - n_{f0}) \cdot (v_2 \otimes s_k) + 2\beta_{T,k} \cdot p_k,$$

where $p_k = 5 v_3 \otimes s_k + e_k, e_k = v_1 \otimes e_k, e_k = \left(\begin{bmatrix} -2 \\ 0 \\ 2 \end{bmatrix} \circ s_k\right).$ The contribution from terminal k may then be expressed as:

$$P \cdot n_{i,q,k} = P \cdot r_{i,q}^H (\tilde{h}_k \circ r_{1,k}) \quad \text{Eq (17)}$$

$$= \alpha_k \cdot (v_i^H v_1)(s_q^H s_k) + 2\beta_{F,k} \cdot$$

$$(n_f - n_{f0}) \cdot (v_i^H v_2)(s_q^H s_k) +$$

$$2\beta_{T,k} \cdot (n_t - n_{t0}) \cdot (v_i^H v_3)(s_q^H s_k) +$$

$$2\beta_{T,k} \cdot (v_i^H \otimes s_q^H) e_k.$$

The scrambling sequences for the Q terminals are orthogonal, so that:

$$s_q^H s_k = \delta_{q,k}. \quad \text{Eq (18)}$$

Equation (18) indicates that the dot product of $s_q$ with $s_k$ is equal to 1.0 when q=k and is equal to 0.0 otherwise.

Vectors $v_1$ through $v_4$ are also orthogonal, so that:

$$v_i^H v_k = 4 \delta_{i,k}. \quad \text{Eq (19)}$$

Equation (17) may then be simplified as follows:

$$P \cdot n_{i,q,k} = 2\beta_{T,k} (v_i^H \otimes s_q^H) e_k = 2\beta_{T,k} (v_i^H v_1)(s_q^H e_k) \quad \text{Eq (20)}$$

Equation (20) indicates that for terminal q, time variation in the channel of another terminal k introduces an error or bias $n_{i,q,k}$ in the projection result $w_{i,q,k}$ for terminal q. This error is due to the fact that $s_q^H e_k \neq 0$ if $k \neq q$.

To mitigate the error contributions from other terminals, the scrambling sequence for terminal q may be applied in a symmetric manner about the center of the tile. For the pilot pattern shown in FIG. 3A, a flipped scrambling sequence $\underline{s}_q^\updownarrow$ of length 3 may be defined for terminal q, as follows:

$$\underline{s}_q^\updownarrow = \begin{bmatrix} 0 & 0 & 1 \\ 0 & 1 & 0 \\ 1 & 0 & 0 \end{bmatrix} \underline{s}_q. \quad \text{Eq (21)}$$

If each cluster includes M=3 pilot symbols, then the original and flipped scrambling sequences for terminal q may be given as:

$s_q = [abc]^T$, original scrambling sequence, and  Eq (22)

$\underline{s}_q^\updownarrow = [cba]^T$, flipped scrambling sequence.

The original scrambling sequence may be used for the two clusters to the left of the tile center, and the flipped scrambling sequence may be used for the two clusters to the right of the tile center. The original and flipped scrambling sequences may also be considered as two versions of the same scrambling sequence.

Figure 5A:
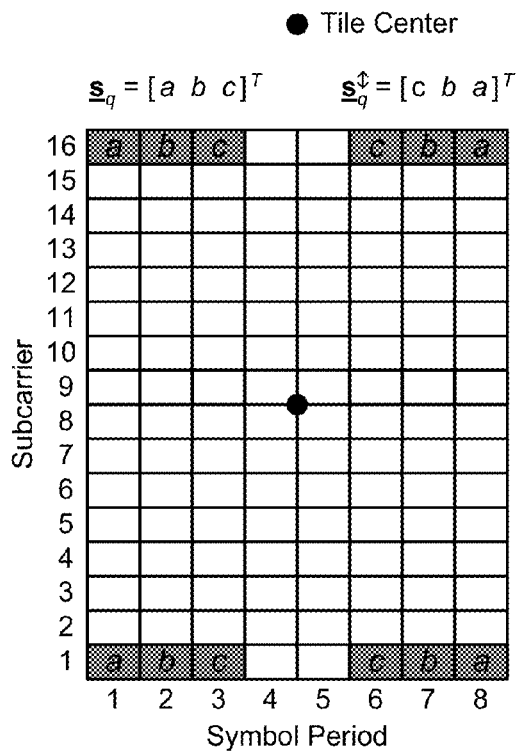
FIGS. 5A through 5D show use of multiple versions of a scrambling sequence to obtain symmetric pilot symbols for the four pilot patterns shown in FIGS. 3A through 3D.

FIG. 5A shows use of the original and flipped scrambling sequences for the pilot pattern shown in FIG. 3A. In this example, elements a, b and c in the original scrambling sequence $s_q$ are applied to three pilot symbols from left to right in each cluster to the left of the tile center. Elements c, b and a in the flipped scrambling sequence $\underline{s}_q^\updownarrow$ are applied to three pilot symbols from left to right in each cluster to the right of the tile center. The pilot symbols are symmetric about the center of the tile. This pilot symmetry reduces error in the channel estimate for terminal q.

Figure 5B:
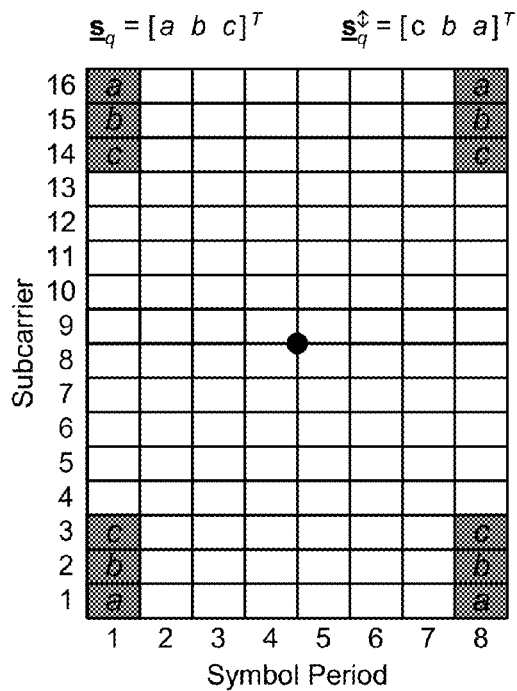

FIG. 5B shows use of the original and flipped scrambling sequences for the pilot pattern shown in FIG. 3B. In this example, elements a, b and c in the original scrambling sequence $s_q$ are applied to three pilot symbols from top to bottom in each cluster above the tile center. Elements c, b and a in the flipped scrambling sequence $\underline{s}_q^\updownarrow$ are applied to three pilot symbols from top to bottom in each cluster below the tile center. The pilot symbols are symmetric about the center of the tile.

Figure 5C:
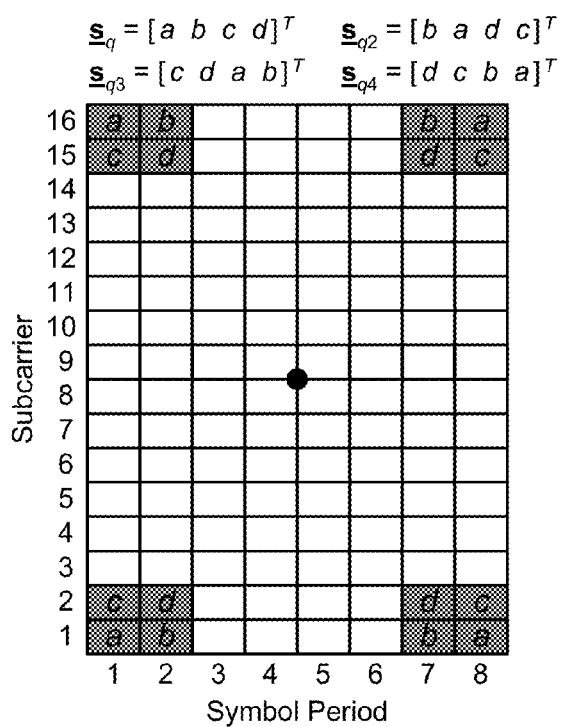

FIG. 5C shows use of four versions of the scrambling sequence for the pilot pattern shown in FIG. 3C. In this example, each cluster includes M=4 pilot symbols, and four versions of the scrambling sequence may be given as:

$s_q = [abcd]^T$, first version of the scrambling sequence, Eq (23)

$s_{q2} = [badc]^T$, second version of the scrambling sequence, $s_{q3} = [cdab]^T$, third version of the scrambling sequence, and $s_{q4} = [dcba]^T$, fourth version of the scrambling sequence.

Elements a, b, c and d in the first version $s_q$ are applied to four pilot symbols in a z-pattern in the upper-left cluster. Elements b, a, d and c in the second version $s_{q2}$ are applied to four pilot symbols in a z-pattern in the upper-right cluster. Elements c, d, a and b in the third version $s_{q3}$ are applied to four pilot symbols in a z-pattern in the lower-left cluster. Elements d, c, b and a in the fourth version $s_{q4}$ are applied to four pilot symbols in a z-pattern in the lower-right cluster. The pilot symbols are symmetric about the center of the tile.

Figure 5D:
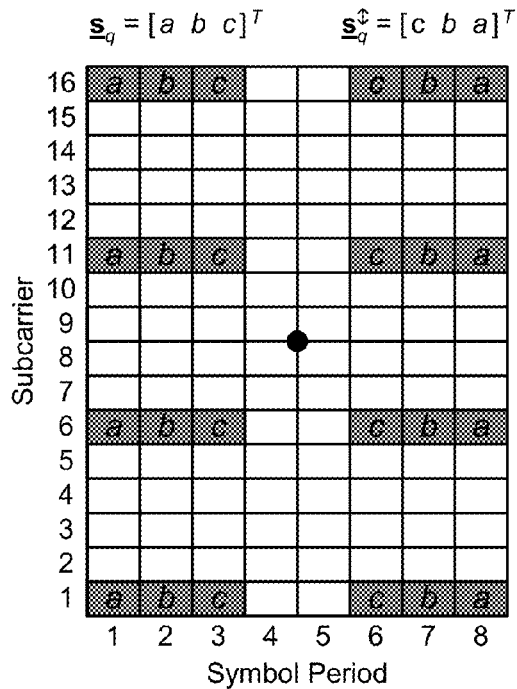

FIG. 5D shows use of the original and flipped scrambling sequences for the pilot pattern shown in FIG. 3D. In this example, elements a, b and c in the original scrambling sequence $s_q$ are applied to three pilot symbols from left to right in each cluster to the left of the tile center. Elements c, b and a in the flipped scrambling sequence $\underline{s}_q^\updownarrow$ are applied to three pilot symbols from left to right in each cluster to the right of the tile center. The pilot symbols are symmetric about the center of the tile.

FIGS. 5A through 5D show four examples in which multiple versions of the scrambling sequence are used to obtain pilot symbols that are symmetric with respect to the center of the tile. In general, any number of versions of the scrambling sequence may be used to achieve symmetric pilot symbols, depending on how the clusters are defined. All versions of the scrambling sequence may have the same elements, but these elements may be arranged in different orders in different versions.

For the pilot pattern shown in FIG. 5A, using the original and flipped scrambling sequences shown in equation (24), basis vectors $r_{i,q}$ for i=1, ..., 4 may be expressed as:

$$r_{1,q} = \frac{1}{\sqrt{P}} \begin{bmatrix} \underline{s}_q \\ \underline{s}_q^\updownarrow \\ \underline{s}_q \\ \underline{s}_q^\updownarrow \end{bmatrix}, \; r_{2,q} = \frac{1}{\sqrt{P}} \begin{bmatrix} -\underline{s}_q \\ -\underline{s}_q^\updownarrow \\ \underline{s}_q \\ \underline{s}_q^\updownarrow \end{bmatrix}, \quad \text{Eq (24)}$$

$$r_{3,q} = \frac{1}{\sqrt{P}} \begin{bmatrix} -\underline{s}_q \\ \underline{s}_q^\updownarrow \\ -\underline{s}_q \\ \underline{s}_q^\updownarrow \end{bmatrix}, \; r_{4,q} = \frac{1}{\sqrt{P}} \begin{bmatrix} \underline{s}_q^\updownarrow \\ -\underline{s}_q \\ -\underline{s}_q \\ \underline{s}_q^\updownarrow \end{bmatrix}.$$

Channel estimation and noise and interference estimation for terminal q may be performed in the manner described above, albeit with the basis vectors $r_{i,q}$ being defined as shown in equation (24) instead of equation (7). The contribution from another terminal k to the projection result $w_{i,q,k}$ for terminal q may be expressed as:

$$n_{i,q,k} = r_{i,q}^H (\tilde{h}_k \circ r_{1,k}) = r_{i,q}^H \underline{\theta}_k, \quad \text{Eq (25)}$$

where $\underline{\theta}_k = \begin{bmatrix} \underline{e}_q \\ -\underline{e}_q^\updownarrow \\ \underline{e}_q \\ -\underline{e}_q^\updownarrow \end{bmatrix}$ and $\underline{e}_q^\updownarrow = \begin{bmatrix} -2 \\ 0 \\ 2 \end{bmatrix} \circ \underline{s}_q^\updownarrow = -\underline{e}_q^\updownarrow.$ It can be shown that $n_{i,q,k}=0$ for i=1, 2, and 4 due to flipping of the scrambling sequence. $n_{3,q,k}$ may not be equal to 0 even with flipping, which means that there may be an error affecting $w_{3,q}$ for the time-varying component of the channel. Nevertheless, the error introduced in the channel estimate is smaller with flipping because of multiplication by an MMSE ratio corresponding to the time-varying component.

For the pilot pattern shown in FIG. 5D, using four versions of the scrambling sequence shown in equation (23), basis vectors $r_{i,q}$ for i=1, ..., 4 may be expressed as:

$$r_{1,q} = \frac{1}{\sqrt{P}} \begin{bmatrix} s_q \\ s_{q2} \\ s_{q3} \\ s_{q4} \end{bmatrix}, \quad r_{2,q} = \frac{1}{\sqrt{P}} \begin{bmatrix} -s_q \\ -s_{q2} \\ -s_{q3} \\ -s_{q4} \end{bmatrix}, \quad \text{Eq (26)}$$

$$r_{3,q} = \frac{1}{\sqrt{P}} \begin{bmatrix} -s_q \\ -s_{q2} \\ -s_{q3} \\ s_{q4} \end{bmatrix}, \quad r_{4,q} = \frac{1}{\sqrt{P}} \begin{bmatrix} s_q \\ -s_{q2} \\ -s_{q3} \\ s_{q4} \end{bmatrix}.$$

Computer simulations show that for high signal-to-noise-and-interference ratio (SINR), the floor of the channel estimation error may decrease by approximately 2 decibels (dB) for vehicular channels with the pilot pattern shown in FIG. 5A. This may improve packet error rate and data performance.

For clarity, the techniques have been described for pilot transmission on the reverse link and for channel and interference estimation for terminals. The techniques may also be used for pilot transmission on the forward link and for channel estimation for a base station. On the forward link, different spatial channels or layers may be assigned different scrambling sequences. The processing for the different layers on the forward link may be analogous to the processing for different terminals on the reverse link.

FIG. 6 shows a design of a process 600 performed by a transmitter to transmit pilot to a receiver. Process 600 may be performed by a terminal to transmit pilot on the reverse link to a base station. Process 600 may also be performed by a base station to transmit pilot on the forward link to terminals. The transmitter may thus be a terminal or a base station, and the receiver may be a base station or a terminal. Pilot symbols for a first cluster in a time frequency block (or tile) may be generated based on a first sequence (block 612). Pilot symbols for a second cluster in the time frequency block may be generated based on a second sequence (block 614). Pilot symbols for a third cluster in the time frequency block may be generated based on the first sequence or a third sequence (block 616). Pilot symbols for a fourth cluster in the time frequency block may be generated based on the second sequence or a fourth sequence (block 618). The pilot symbols may be transmitted in their respective clusters (block 620).

The first, second, third and fourth sequences may include common elements arranged in different orders and may be considered as different versions of a single sequence. For example, the elements in the second sequence may be in a reverse order (or flipped) with respect to the elements in the first sequence. The pilot symbols may be generated such that they are symmetric about the center of the time frequency block, e.g., as shown in FIGS. 5A through 5D. The pilot symbols in all clusters may also be arranged in other manners, possibly non-symmetric manners. Each sequence may include M elements used to generate M pilot symbols for one cluster, where M may be three, four, etc. Each sequence may include elements in a column of a Fourier matrix or elements defined in other manners.

For the reverse link, the first sequence may be assigned to a terminal and may be orthogonal to at least one other sequence assigned to at least one other terminal sharing the first cluster. Similarly, the second, third, and fourth sequences may be assigned to the terminal. Each sequence assigned to the terminal may be orthogonal to other sequence(s) assigned to other terminal(s) for the cluster in which that sequence is used. For the forward link, the first sequence may be assigned to a layer and may be orthogonal to at least one other sequence assigned to at least one other layer for the first cluster.

FIG. 7 shows a design of an apparatus 700 for transmitting pilot. Apparatus 700 includes means for generating pilot symbols for a first cluster in a time frequency block based on a first sequence (module 712), means for generating pilot symbols for a second cluster in the time frequency block based on a second sequence (module 714), means for generating pilot symbols for a third cluster in the time frequency block based on the first sequence or a third sequence (module 716), means for generating pilot symbols for a fourth cluster in the time frequency block based on the second sequence or a fourth sequence (module 718), and means for transmitting the pilot symbols in their respective clusters (module 720). The first, second, third and fourth sequences may include common elements arranged in different orders. Modules 712 to 720 may comprise processors, electronics devices, hardware devices, electronics components, logical circuits, memories, etc., or any combination thereof.

FIG. 8 shows a design of a process 800 performed by a receiver to process pilot received from one or more transmitters. Process 800 may be performed by a base station to process pilot received on the reverse link from one or more terminals. Process 800 may also be performed by a terminal to process pilot received on the forward link from a base station for one or more layers, where each layer may be considered as a separate transmitter. The receiver may thus be a base station or a terminal, and the transmitter may be a terminal or a base station. Received pilot symbols may be obtained from multiple clusters in a time frequency block (block 812). Each of multiple basis vectors may be formed with multiple versions of a sequence assigned to a transmitter (block 814). The sequence may include M elements, and the multiple versions of the sequence may correspond to different orderings of the M elements in the sequence. The multiple basis vectors may be formed further based on a particular channel model, e.g., a channel model with linearly varying time component and linearly varying frequency component, as shown in equation (7). The received pilot symbols may be processed with the multiple basis vectors to obtain a channel estimate for the transmitter, e.g., as shown in equations (8) and (11) (block 816). The received pilot symbols may also be processed with at least one other basis vector to obtain a noise and interference estimate, e.g., as shown in equations (8) and (9) (block 818).

For block 814, each basis vector may be formed based on an original version and a flipped version of the sequence, e.g., as shown in equation (22). Alternatively, each basis vector may be formed based on four versions of the sequence, e.g., as shown in equation (23). In any case, the multiple versions of the sequence may be used to generate pilot symbols for the multiple clusters such that the pilot symbols are symmetric about the center of the time frequency block.

For block 816, multiple complex values (e.g., $w_{i,q}$) may be obtained based on dot products of the received pilot symbols with the multiple basis vectors, e.g., as shown in equation (8). The multiple complex values may comprise a first complex value indicative of an average channel gain for the time frequency block, a second complex value indicative of channel variation across frequency, and a third complex value indicative of channel variation across time. The channel estimate for the transmitter may be derived based on the multiple complex values, e.g., as shown in equation (11).

FIG. 9 shows a design of an apparatus 900 for processing received pilot. Apparatus 900 includes means for obtaining received pilot symbols from multiple clusters in a time frequency block (module 912), means for forming each of multiple basis vectors with multiple versions of a sequence assigned to a transmitter (module 914), means for processing the received pilot symbols with the multiple basis vectors to obtain a channel estimate for the transmitter (module 916), and means for processing the received pilot symbols with at least one other basis vector to obtain a noise and interference estimate (module 918). The multiple versions of the sequence may correspond to different orderings of elements in the sequence. Modules 912 to 918 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units at an entity (e.g., a terminal or a base station) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 142$x$, 142$y$ or 182 in FIG. 1) and executed by a processor (e.g., processor 140$x$, 140$y$ or 180). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor configured to obtain received pilot symbols from multiple clusters in a time frequency block, to form each of multiple basis vectors with multiple versions of a sequence assigned to a transmitter, and to process the received pilot symbols with the multiple basis vectors, wherein the processor is configured to form each basis vector based on four versions of the sequence used to generate pilot symbols for the multiple clusters, the pilot symbols being approximately symmetric about a center of the time frequency block; and
a memory coupled to the processor.

2. The apparatus of claim 1, wherein the multiple versions of the sequence correspond to different orderings of elements in the sequence.

3. The apparatus of claim 1, wherein the processor is configured to form each basis vector based on an original version and a flipped version of the sequence.

4. The apparatus of claim 1, wherein the processor is configured to form the multiple basis vectors further based on a channel model with linearly varying time component and linearly varying frequency component.

5. The apparatus of claim 1, wherein the processor is configured to obtain multiple complex values based on dot products of the received pilot symbols with the multiple basis vectors, and to derive a channel estimate for the transmitter based on the multiple complex values.

6. The apparatus of claim 5, wherein the multiple complex values comprise a first complex value indicative of an average channel gain for the time frequency block.

7. The apparatus of claim 6, wherein the multiple complex values comprise a second complex value indicative of channel variation across frequency and a third complex value indicative of channel variation across time.

8. The apparatus of claim 1, wherein the processor is configured to obtain at least one complex value based on dot product of the received pilot symbols with at least one other basis vector, and to derive a noise and interference estimate based on the at least one complex value.

9. A method comprising:
obtaining received pilot symbols from multiple clusters in a time frequency block;
forming each of multiple basis vectors with multiple versions of a sequence assigned to a transmitter, the pilot symbols being approximately symmetric about a center of the time frequency block; and
processing the received pilot symbols with the multiple basis vectors.

10. The method of claim 9, wherein the multiple versions of the sequence correspond to different orderings of elements in the sequence.

11. The method of claim 9, wherein the processing the received pilot symbols with the multiple basis vectors comprises:
obtaining multiple complex values based on dot products of the received pilot symbols with the multiple basis vectors, and
deriving a channel estimate for the transmitter based on the multiple complex values.

12. The method of claim 11, wherein the multiple complex values comprise a first complex value indicative of an average channel gain for the time frequency block, a second complex value indicative of channel variation across frequency, and a third complex value indicative of channel variation across time.

13. The method of claim 9, further comprising:
obtaining at least one complex value based on dot product of the received pilot symbols with at least one other basis vector; and
deriving a noise and interference estimate based on the at least one complex value.

14. An apparatus comprising:
means for obtaining received pilot symbols from multiple clusters in a time frequency block;
means for forming each of multiple basis vectors with multiple versions of a sequence assigned to a transmitter, the pilot symbols being approximately symmetric about a center of the time frequency block; and
means for processing the received pilot symbols with the multiple basis vectors.

15. The apparatus of claim 14, wherein the means for processing the received pilot symbols with the multiple basis vectors comprises
- means for obtaining multiple complex values based on dot products of the received pilot symbols with the multiple basis vectors, and
- means for deriving a channel estimate for the transmitter based on the multiple complex values.

16. The apparatus of claim 14, further comprising:
- means for obtaining at least one complex value based on dot product of the received pilot symbols with at least one other basis vector; and
- means for deriving a noise and interference estimate based on the at least one complex value.

17. A non-transitory processor-readable medium including instructions stored thereon, comprising:
- a first instruction set for obtaining received pilot symbols from multiple clusters in a time frequency block;
- a second instruction set for forming each of multiple basis vectors with multiple versions of a sequence assigned to a transmitter, the pilot symbols being approximately symmetric about a center of the time frequency block; and
- a third instruction set for processing the received pilot symbols with the multiple basis vectors.

* * * * *